United States Patent
Sutherland et al.

(10) Patent No.: US 11,215,966 B2
(45) Date of Patent: Jan. 4, 2022

(54) METHODS AND SYSTEMS FOR ONE-SIDED FASTENER ASSEMBLY INSTALLATION

(71) Applicant: The Boeing Company, Chicago, IL (US)

(72) Inventors: Melanie J. Sutherland, Long Beach, CA (US); Christopher Lance Newbolt, Long Beach, CA (US); Sabyasachi Basu, Kingston, WA (US); Mark Woods, Renton, WA (US); Victor X. Du, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 112 days.

(21) Appl. No.: 16/673,532

(22) Filed: Nov. 4, 2019

(65) Prior Publication Data
US 2021/0132572 A1    May 6, 2021

(51) Int. Cl.
*G05B 19/402*    (2006.01)
*B25B 21/00*    (2006.01)

(52) U.S. Cl.
CPC ............ *G05B 19/402* (2013.01); *B25B 21/00* (2013.01); *G05B 2219/45055* (2013.01)

(58) Field of Classification Search
CPC ........ B21J 15/022; B21J 15/26; B21J 15/285; B23B 45/02; H02P 29/0027; H02P 29/40; H02P 7/06; G05B 19/4097; B25B 23/01
See application file for complete search history.

(56) References Cited

U.S. PATENT DOCUMENTS

| | | | | |
|---|---|---|---|---|
| 9,032,602 | B2* | 5/2015 | Woods | F16B 19/1072 29/407.03 |
| 9,797,707 | B2 | 10/2017 | Bumgardner et al. | |
| 2007/0180674 | A1* | 8/2007 | Morden | G05B 19/402 29/407.01 |
| 2007/0265942 | A1* | 11/2007 | Freeman | G06Q 10/08 705/28 |
| 2019/0386600 | A1* | 12/2019 | Woyciesjes | B21J 15/26 |

* cited by examiner

*Primary Examiner* — Kidest Bahta
(74) *Attorney, Agent, or Firm* — McDonnell Boehnen Hulbert & Berghoff LLP (57) ABSTRACT

Methods and systems for installing and verifying installation of a fastener assembly using predictive verification. A method includes receiving, at a processor, at least one fastener assembly hole characteristic of a fastener assembly hole. The method further includes determining, via the processor, whether the at least one fastener assembly hole characteristic is within a predetermined range of fastener assembly hole variable and, upon determining the at least one fastener assembly hole characteristic is within the predetermined range of fastener assembly hole variables, transmitting instructions, via the processor, to a fastening device to initiate installation of a fastener assembly in the fastener assembly hole. The processor then receives at least one installation value of the fastener assembly and determines via the processor, whether the installation value is within a predetermined range of fastener installation variables.

20 Claims, 5 Drawing Sheets

METHODS AND SYSTEMS FOR ONE-SIDED FASTENER ASSEMBLY INSTALLATION

FIELD

The present disclosure relates generally to installation and verification of fastener assemblies, and, more particularly, to using a predictive verification model during one-sided fastener installation for preventative maintenance.

BACKGROUND

Manual and automated fastening tools may be used to install fastener assemblies, such as a one-sided fastener. Access to the back side of an installed one-sided fastener may be required to verify the one-sided fastener was installed correctly, particularly when the installation is performed manually. Manual installation techniques may be necessary for fastener assemblies requiring sealant, as automated machines typically are not suited to install such fastener assemblies. This back side inspection is time consuming, cost prohibitive, and prone to errors. Additionally, back side inspection may require large equipment which is not accessible to all parts of a structure, such as an aircraft.

SUMMARY

In an example, a method of installing a fastener assembly in a fastener assembly hole is described. The method comprises receiving, at a processor, at least one fastener assembly hole characteristic of a fastener assembly hole, determining, via the processor, whether the at least one fastener assembly hole characteristic is within a predetermined range of fastener assembly hole variables, upon determining the at least one fastener assembly hole characteristic is within the predetermined range of fastener assembly hole variables, transmitting instructions, via the processor to a fastening device, to initiate installation of a fastener assembly in the fastener assembly hole, receiving, at the processor, at least one installation value of the fastener assembly, and determining, via the processor, whether the installation value is within a predetermined range of fastener installation variables.

In another example, a fastening system is described comprising a grip gage, configured to measure characteristics of a fastener assembly and a fastener assembly hole, a nutrunner configured to install the fastener assembly in the fastener assembly hole, and a processor configured to carry out operations, the operations comprising: receiving at least one fastener assembly hole characteristic of the fastener assembly hole via the grip gage, determining whether the at least one fastener assembly hole characteristic is within a predetermined range of fastener assembly hole variables, upon determining the at least one fastener assembly hole characteristic is within the predetermined range of fastener assembly hole variables, transmitting instructions to the nutrunner to initiate installation of the fastener assembly in the fastener assembly hole, receiving at least one installation value of the fastener assembly, and determining whether the installation value is within a predetermined range of fastener installation variables.

In another example, computer-readable media storing instructions executable by one or more processors is described, wherein the instructions, when executed, cause the one or more processors to perform functions comprising: receiving at least one fastener assembly hole characteristic of a fastener assembly hole, determining whether the at least one fastener assembly hole characteristic is within a predetermined range of fastener assembly hole variables, upon determining the at least one fastener assembly hole characteristic is within the predetermined range of fastener assembly hole variables, transmitting instructions to a fastening device to initiate installation of a fastener assembly in the fastener assembly hole, receiving at least one installation value of the fastener assembly, and determining whether the installation value is within a predetermined range of fastener installation variables.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, methods and systems for installing and verifying installation of a fastener assembly are described. More specifically, example methods and systems are directed to performing an analysis using predictive verification to determine whether a fastener assembly was installed correctly or not. In some embodiments, an installation is considered successful when fastener installation values meet fastener installation requirements (e.g., bulb diameter, bulb height, front side pin protrusion, etc.). These requirements may be provided by the manufacturer in some examples. This is desirable particularly in one sided installations as it reduces or eliminates the need for a blind back side inspection at a later time, such as during maintenance. As such, the process may be designed in such a way to ease the inspection process and identify potential fastener assembly and installation issues. Further, some embodiments of this disclosure allow for predictive verification methods to be performed on manual machines which communicate wirelessly with remote processors and/or computing devices. Manual installation is desirable if the fastener assembly requires sealant as current automated machines cannot handle fasteners requiring sealant.

Figure 1A:
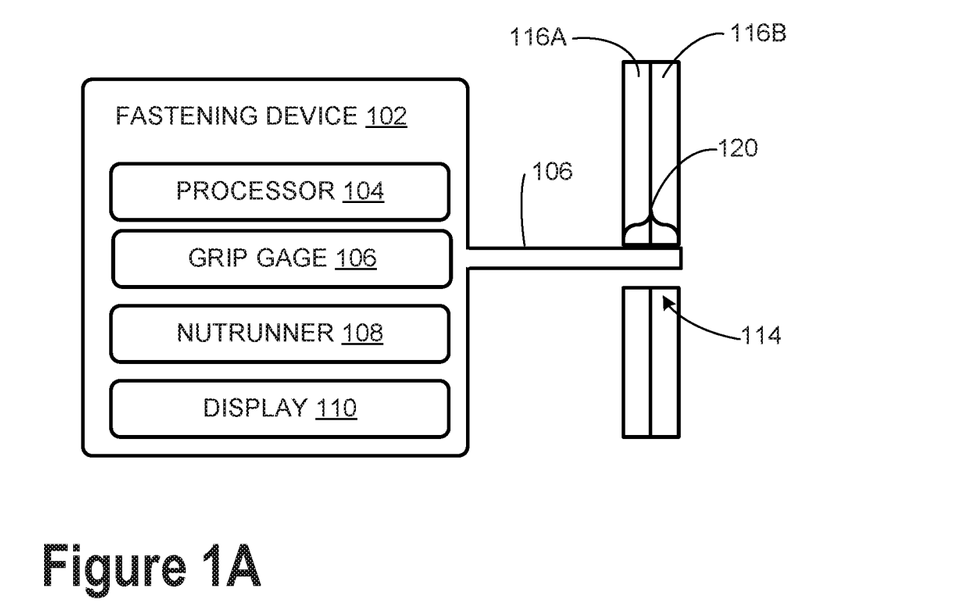
FIG. 1A is an example fastening device, according to an example implementation.

Referring now to FIG. 1A, an example fastening device 102 and fastener assembly hole 114 before installation, according to an example implementation. In some embodiments, the fastening device 102 includes a processor 104, a grip gage 106, a nutrunner 108, and a display 110. In some examples, the fastening device 102 includes these components in a single structure. In other embodiments, a number of fastening devices 102 may be used to carry out the methods disclosed herein which collectively include these components. In some examples, the processor 104 is included in the fastening device 102. In alternative embodiments, the processor 104 may be located remotely from the fastening device 102 and configured to communicate with the fastening device 102 via, for example, a wireless network such as Wi-Fi, BLUETOOTH, or cellular data. In some examples where multiple fastening devices 102 are used, each component may be configured to communicate with the processor 104 through a wired connection or a wireless network, as described above.

The processor 104 is configured to evaluate installation parameters before, during, and/or after installation to verify whether the installation was successful. Additionally or alternatively, the processor 104 may be configured to determine appropriate installation values (e.g., torque range, rotational speed) based on characteristics (i.e., measurements) of the fastener assembly hole 114 and/or fastener assembly 112.

Before installation, the fastening device 102 may take various measurements of the fastener assembly hole 114 by way of, for example, the grip gage 106. More specifically, the grip gage 106 may be configured to measure the fastener assembly hole 114 depth 120 and/or width 222 (shown in FIG. 2). For example, in some embodiments, the grip gage 106 may include a probe to be inserted into the fastener assembly hole 114, as shown in FIG. 1A. Further, in some examples, the grip gage 106 may be digital and may transmit the measured characteristic to the processor 104. Alternatively, the grip gage 106 may be a manual grip gage 106. In these examples, an installer (i.e., a user) may manually take the measurement(s) of the fastener assembly hole 114. In these examples, the fastening device 102 may have a user interface where a user can input these measured fastener assembly hole 114 characteristics to be transmitted to the processor 104. Any alternative device suitable for taking measurements may be used to measure characteristics of the fastener assembly hole 114.

Figure 1B:
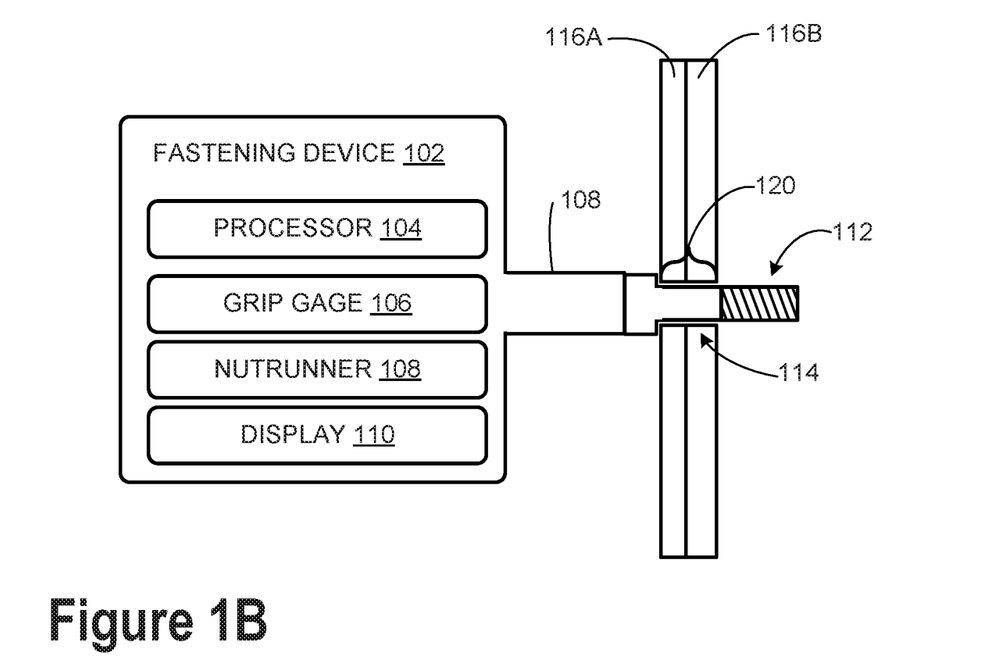
FIG. 1B is an example fastening device and fastener assembly, according to an example implementation.
Figure 3:
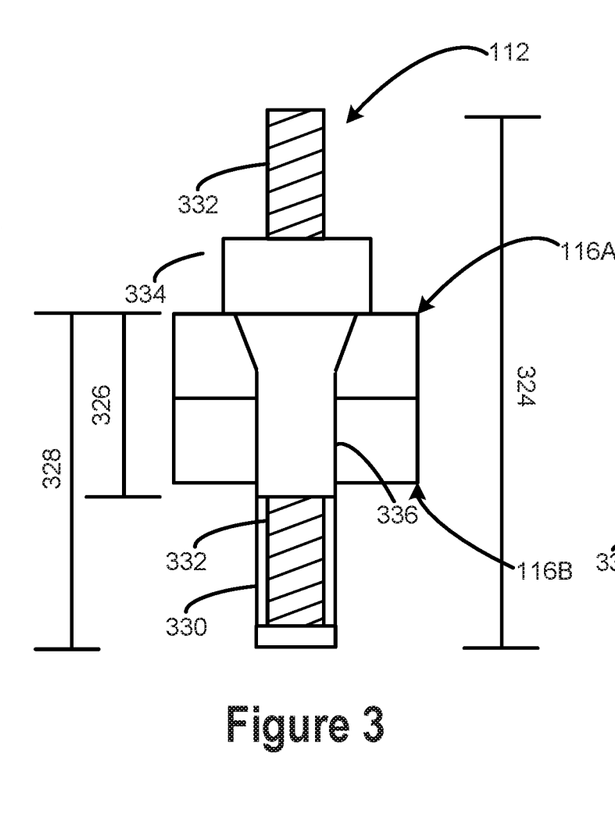
FIG. 3 is an example fastener assembly, according to an example implementation.

Further, before installation, the fastening device 102 may take various measurements of the fastener assembly 112 (as shown in FIG. 1B) by way of, for example, the grip gage 106. For example, the grip gage 106 may be configured take measurements of the fastener assembly 112 (as shown in FIG. 1B) including, but not limited to, fastener assembly 112 length 324 (as shown in FIG. 3), diameter, locking mechanism length 326 (as shown in FIG. 3), installation length 328 (as shown in FIG. 3), thread pitch, and/or thread angle. In practice, these values may already be known based on the fastener assembly 112 manufacturing data according to a manufacturing model number, for example. The determined measurements and/or known values of the fastener assembly 112 may be transmitted to the processor 104 in any of the methods described above (e.g., digitally, wirelessly, manual user input, etc.).

Once the fastener assembly hole 114 and/or fastener assembly 112 characteristics are transmitted to the processor 104, the processor 104 may determine whether the fastener assembly hole 114 is suitable for installation and/or suitable installation values (e.g., a torque range and/or rotational speed) based on said measured characteristics. More specifically, the processor 104 may perform a predictive verification algorithm and/or calculation where the measured fastener assembly hole 114 and fastener assembly 112 are used as input values. A predictive verification algorithm may be determined at an earlier time, such as during an initial testing phase.

In some example embodiments, the processor 104 may store or have access to a database including a predetermined range of fastener assembly hole variables. The predetermined range of fastener assembly hole variables may be developed before installation. For example, the predetermined range of fastener assembly hole variables may be developed during testing and represent a range of values that resulted in successful installations. More specifically, in one example, the predetermined range of fastener assembly hole variables may correspond to assembly hole depths that resulted in successful installations during testing. Further, in some examples, there may be a number of predetermined ranges of fastener assembly hole variables based on characteristics of the structure(s) 116A and 116B (e.g., material), or the fastener assembly 112 (e.g., manufacturing model number or measurements of the fastener assembly 112). Many other examples are possible.

The processor 104 may then evaluate the measured fastener assembly hole 114 characteristic and/or fastener assembly 112 measurement to determine whether the measured fastener assembly hole 114 characteristic and/or fastener assembly 112 measurement is within the predetermined range of fastener assembly hole variables. In some examples, this evaluation may be repeated a number of times. For example, if several characteristics are measured and used as inputs for the determination of whether the installation was successful, the processor 104 may make this determination for each measured value.

Additionally, in some embodiments the processor 104 may determine suitable installation values, such as an installation torque range or installation rotational speed range. The processor 104 may use the measured and received fastener assembly hole 114 characteristics and/or fastener assembly 112 values (and/or data corresponding to the fastener assembly factory information) to determine the suitable installation values. These installation value ranges may similarly be developed during testing and represent ranges resulting in successful installations.

For example, during initial testing, the installation rotational speed range may be developed. For example, the nutrunner 108 may have a maximum speed capacity. The fastener assembly 112 to be installed may additionally have a recommended installation speed (i.e., manufacturing data). The nutrunner 108 installation speed may be determined by installing test fastener assemblies 112 in 5-15% increments of the nutrunner 108 max speed capacity, for example, and determining the torque at the fastener assembly 112 break-off point or at other points during installation. By analyzing this data, an installation rotational speed range may be developed based on successful installations. Installation time may additionally be taken into account. In practice, for example, if the installation speed is too slow, that increases the installation time compared to the standard tools. Conversely, if the speed is too fast, the structure(s) 116A and 116B installing into and the fastener assembly 112 may develop too much heat.

Similarly, a suitable relationship between the torque and angle may be developed during testing. As described above, in some examples, a portion of the fastener assembly 112 may be designed to break away once the fastener assembly 112 is installed, or at another point in installation. A range of torque values and angles may be determined based on the point at with the portion of the fastener assembly 112 breaks off. In another example, the torque range and angle range may be determined at various times during installation. Additionally or alternatively, the range of torque and angles may be determined once the nutrunner 108 meets or exceeds a certain torque value (e.g., 5.5 in-lbs). This may achieve a more accurate calculation of the torque angle relationship by eliminating inaccurate data at the start of installation (e.g., a "false start").

These determined torque and angle range and rotational speed ranges may be used as an installation parameter, as it is desirable to have little variation between fastener assemblies. Reducing variation on installation parameters increases chances of successful installation fastener assembly installations.

Upon determining the at least one fastener assembly hole characteristic is within the predetermined range of fastener assembly hole variables, the processor 104 may transmit instructions to the fastening device 102 and/or the nutrunner 108 to initiate installation of a fastener assembly 112 in the fastener assembly hole 114. Further, in examples where the processor 104 determines suitable installation values, the processor 104 may additionally transmit the determined installation values (i.e., installation torque range and/or installation rotational speed range).

Referring now to FIG. 1B, a fastening device 102, fastener assembly 112, and fastener assembly hole 114 after installation, according to an example implementation. The fastening device 102 may then install the fastener assembly 112 in the fastener assembly hole 114 according to the instructions received from the processor 104.

In some embodiments, the nutrunner 108 may extend from the fastening device 102 and may be compatible with the head of the fastener assembly 112, as shown in FIG. 1B. Further, in some examples, the nutrunner 108 may further include a gearing arrangement configured to install the fastener assembly 112 in the fastener assembly hole 114 according the received installation values, such as the torque range and/or the rotational speed range.

The nutrunner 108 may include additional components such as a nose adapter and/or wrench adapter for various fastener assembly 112 sizes and a motor. In some examples, the nutrunner 108 may be configured to manually torque the fastener assembly 112. Further, in some examples, the fastener assembly 112 includes a one-sided fastener. Many other examples are possible.

Figure 4:
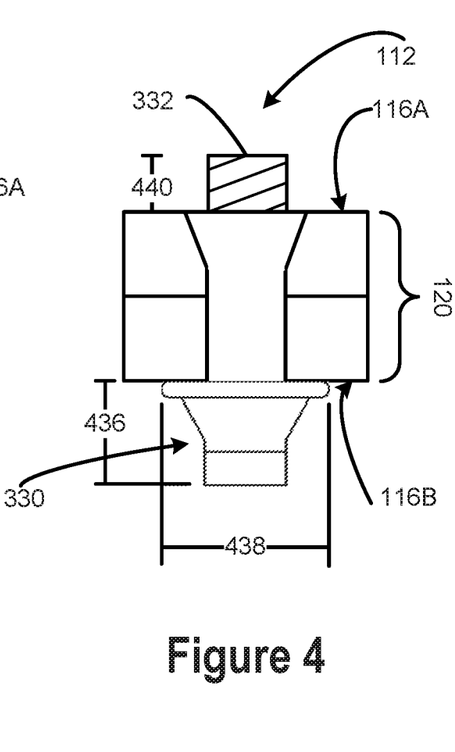
FIG. 4 is an example fastener assembly and fastener assembly hole, according to an example implementation.

After installation of the fastener assembly 112, the processor 104 may determine whether the installation was successful. More specifically, in some examples, the processor 104 may perform a regression model wherein input values of the regression model include at least one the installation values. Installation values may include, but are not limited to installation depth, a front side pin protrusion 440 (as shown in FIG. 4), countersink depth, a maximum installation torque, an installation torque average, or a torque angle relationship to predict characteristics such as bulb diameter or a bulb height. In some examples, the regression model may be developed previously during testing. Further, the processor 104 may be configured to carry out a number of regression models corresponding to a number of various fastener assembly 112 types (e.g., manufacturing models).

In practice, the regression model may be developed based on various parameters during testing. For example, once installed, a fastening assembly 112 may include features of a successful installation or a defective installation (e.g., split bulb). During testing, there may be access to the back side for inspection of the bulb diameter 432 and/or bulb height 436 (shown in FIG. 4). Either or both of these parameters may be estimated based on installation values, such as an installation torque angle or a grip condition which is a variable corresponding to the fastener assembly diameter and the fastener assembly hole 114 width 222. By way of example, a bulb diameter 438 may be predicted by the following equation developed during testing, where J represents bulb diameter 438, A represents installation angle, B represents grip condition, and X, Y, and Z represent calculated coefficients (many other examples are possible).

$$J=X*A+Y*B+Z$$

Once installed, if the predicted bulb diameter (J) value falls within an acceptable range, the processor may determine that the installation was successful. This determination may be made for other installation values, such as bulb height 436.

In some example embodiments, the fastening device 102 may further include a display 110. In these examples, the processor 104 may transmit a message indicating the installation was successful to the display 110.

In some example embodiments, the processor 104 may store the resulting determination of whether or not the installation was successful for retrieval at a later time (e.g., during maintenance). For example, the installed fastener assembly 112 or fastener assembly hole 114 may have some associated identifier. In some examples, this identifier may be stored along with any measured fastener assembly hole 114 characteristics, fastener assembly 112 measurements, installation values, and/or the determination of whether the installation was successful to be retrieved at later time (e.g., during maintenance).

Additionally or alternatively, in some examples, the processor 104 may further be configured to communicate with a remote computing device (e.g., a cloud network or remote computer). This remote computing device may additionally be configured to store the installed fastener assembly 112 or fastener assembly hole 114 identifier along with any measured fastener assembly hole 114 characteristics, fastener assembly 112 measurements, installation values, and/or the determination of whether the installation was successful to be retrieved at later time (e.g., during maintenance).

In some example embodiments, the fastening device 102 further includes a global positioning system (GPS), or other suitable position tracking device, configured to detect the location of the fastening device 102, fastener assembly hole 114, and/or the fastener assembly 112. In this way, the fastener assembly hole 114 location may be used as a fastener assembly hole 114 identifier. For example, the processor 104 is configured to receive and record the location of the fastening device 102, fastener assembly hole 114, and/or the fastener assembly 112 in association with the fastener assembly hole characteristics and/or fastener installation values. Further, the location may be recorded in a database with the determination of whether the installation was successful or not. The location may be referred back to, for example, during maintenance, to identify characteristics of the installed fastener assembly 112.

In some examples, the structure on which the fastener assembly hole 114 is located is two structures 116A and 116B adjacent to each other. This is desirable in examples where the fastening assembly 112 fastens the two structures 116A and 116B together.

Figure 2:
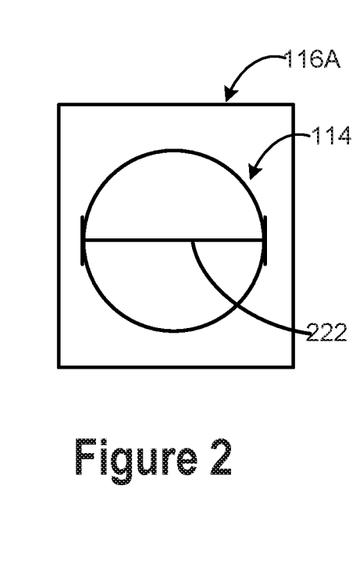
FIG. 2 is an example fastener assembly hole, according to an example implementation.

Referring now to FIG. 2, the fastener assembly hole 114 on the structure(s) 116A and 116B, according to an example embodiment. The fastener assembly hole 114 width 222 may be measured via the grip gage 106, or another suitable measuring device, according to any of the methods described herein.

Referring now to FIG. 3, a fastener assembly 112 during installation, according to an example embodiment. In some example embodiments, the fastener assembly 112 includes a screw 332, a hex nut 334, a locking feature 336, and a sleeve 330. The hex nut 334, locking feature 336, and sleeve 330 may each substantially surround the screw 332. Additionally, in some examples, the screw 332 may include a break groove configured to facilitate breaking the screw 332 during or after the installation is completed.

In practice, during installation the fastener assembly 112 is placed in the fastener assembly hole 114. More specifically, a portion of the screw 332, the locking feature 336, and the sleeve 330 may be inserted in the fastener assembly hole 114.

The fastener assembly hole 114 measurements taken via the grip gage 106 may be used in fastener assembly 112 selection. For example, various fastener assembly 112 types may be more suitable for different fastener assembly hole depths 120. In some embodiments, the fastener assembly 112 length 324, installation length 328, and locking mechanism length 326 may be known from data corresponding to the fastener assembly factory information or measured via a suitable measuring device, according to any of the methods described herein. In some examples, a sleeve may be positioned around the locking mechanism length 326 and/or fastener assembly threads.

Referring now to FIG. 4, an installed fastener assembly 112 in a fastener assembly hole 114, according to an example embodiment. Once installed, the sleeve 330 may form a bulb shape adjacent to the backside 116B of the structure(s). During installation, the nutrunner 108 screws the fastener assembly into the fastener assembly hole 114 to get the locking feature 336 in place, as shown in FIG. 3. The nutrunner 108 may then reach a torque value high enough such that the portion of the screw 332 may break off at the break groove, shortening the front side pin protrusion 440. The sleeve 330 may then fold over a portion of the screw 332 and the locking mechanism to create a bulb shape, as shown in FIG. 4. Additionally, a portion of the screw 332 may break off at the break groove, shortening the front side pin protrusion 440.

Bulb height 436 and bulb diameter 438 may be indicative of whether the installation was successful, however these measurements may not be readily obtained, as described above. As such, in some examples, the processor 104 predicts the bulb height 436 and bulb diameter 438 by utilizing the fastener assembly 112 characteristics, fastener assembly hole 114 characteristics, and installation values to determine whether the installation was successful or not. In some examples where the fastening device 102 includes a display 110, the processor 104 may transmit a message to the display 110 including a determination of whether the installation was successful or not.

Figure 5:
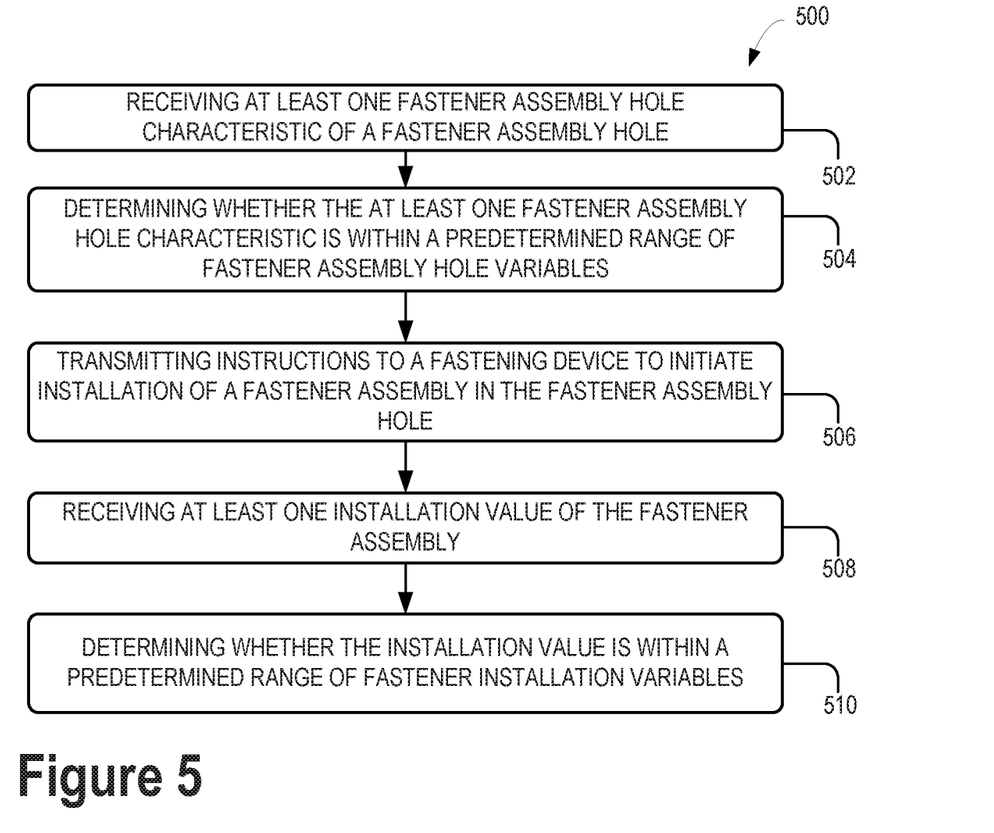
FIG. 5 shows a flowchart of an example method for one-sided fastener assembly installation and verification, according to an example implementation.

Referring now to FIG. 5, a flowchart of an example of a method 500 of installing and verifying installation of fastener assemblies based using predictive verification methods, according to an example implementation. Method 500 shown in FIG. 5 presents an example of a method that could be used with a fastening device 102 shown in FIG. 1. Further, devices or systems may be used or configured to perform logical functions presented in FIG. 5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 500 may include one or more operations, functions, or actions as illustrated by one or more of blocks 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compactdisc read only memory (CD-ROM), for example. The computer readable media may also be any other volatile or non-volatile storage systems. The computer readable medium may be considered a tangible computer readable storage medium, for example.

In addition, each block or portions of each block in FIG. 5, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes receiving, at a processor, at least one fastener assembly hole characteristic of a fastener assembly hole.

Figure 6:
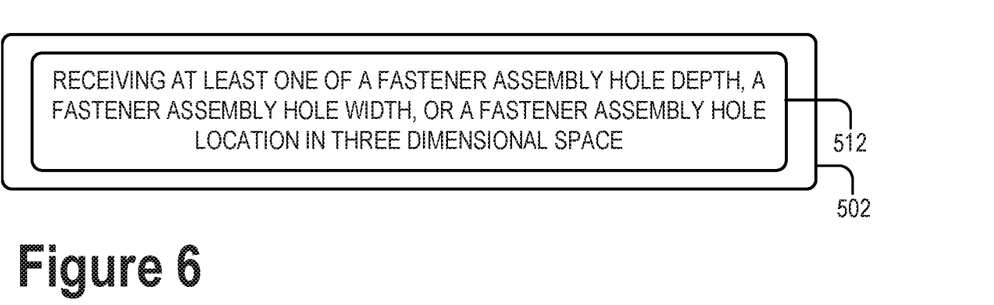
FIG. 6 shows a flowchart of an example method for one-sided fastener assembly installation and verification of the method of FIG. 5, according to an example implementation

FIG. 6 shows a flowchart of an example method for receiving at least one fastener assembly hole characteristic of a fastener assembly hole, as shown in block 502, according to an example implementation. At block 512, method 500 may further include receiving at least one fastener assembly hole characteristic comprises receiving at least one of a fastener assembly hole depth, a fastener assembly hole width, or a fastener assembly hole location in three dimensional space.

Returning to FIG. 5, at block 504, the method 500 includes determining, via the processor, whether the at least one fastener assembly hole characteristic is within a predetermined range of fastener assembly hole variables.

At block 506, the method 500 includes transmitting instructions, via the processor to a fastening device, to initiate installation of a fastener assembly in the fastener assembly hole, upon determining the at least one fastener assembly hole characteristic is within the predetermined range of fastener assembly hole variables.

Figure 7:
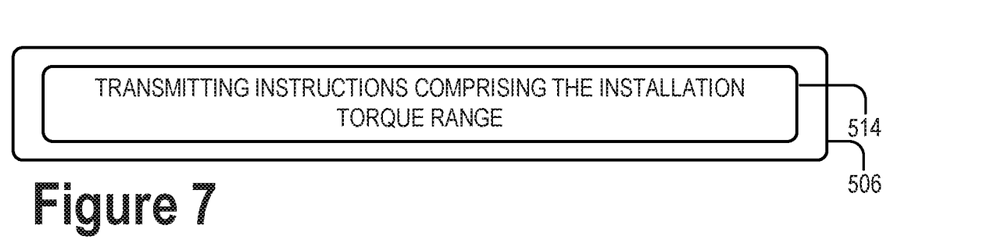
FIG. 7 shows a flowchart of an example method for one-sided fastener assembly installation and verification of the method of FIG. 5, according to an example implementation

FIG. 7 shows a flowchart of an example method for transmitting instructions to initiate installation of a fastener assembly in the fastener assembly hole, as shown in block 506. At block 514, method 500 includes transmitting instructions, via the processor to the fastening device, to initiate installation of the fastener assembly in the fastener assembly hole comprises transmitting instructions comprising the installation torque range.

Figure 8:
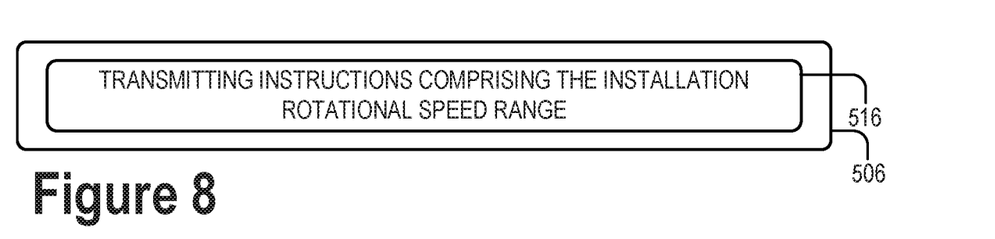
FIG. 8 shows a flowchart of an example method for one-sided fastener assembly installation and verification of the method of FIG. 5, according to an example implementation

FIG. 8 shows a flowchart of an example method for transmitting instructions to initiate installation of a fastener assembly in the fastener assembly hole, as shown in block 506. At block 516, method 500 includes transmitting instructions, via the processor to the fastening device, to initiate installation of the fastener assembly in the fastener assembly hole comprises transmitting instructions comprising the installation rotational speed range.

Returning to FIG. 5, at block 508, the method 500 includes receiving, at the processor, at least one installation value of the fastener assembly.

Figure 9:
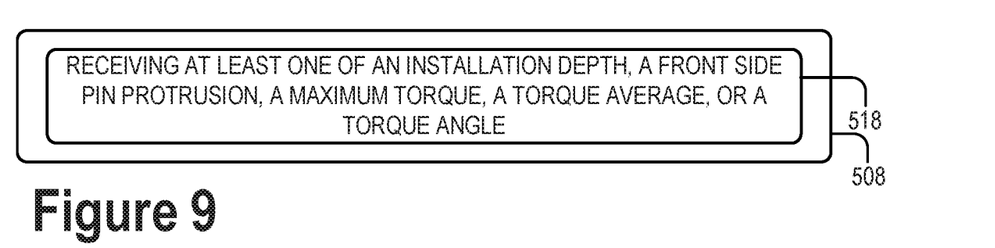
FIG. 9 shows a flowchart of an example method for one-sided fastener assembly installation and verification of the method of FIG. 5, according to an example implementation

FIG. 9 shows a flowchart of an example method for receiving, at the processor, at least one installation value of the fastener assembly, as shown in FIG. 508. At block 518, method 500 includes receiving at least one of an installation depth, a protrusion, a bulb diameter, a bulb height, a maximum torque, a torque average, or a torque angle.

Returning to FIG. 5, at block 510, the method 500 includes determining, via the processor, whether the installation value is within a predetermined range of fastener installation variables.

Figure 10:
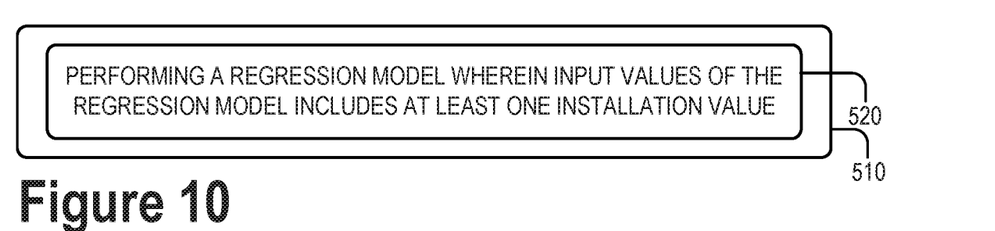
FIG. 10 shows a flowchart of an example method for one-sided fastener assembly installation and verification of the method of FIG. 5, according to an example implementation

FIG. 10 shows a flowchart of an example method for determining, via the processor, whether the installation value is within a predetermined range of fastener installation variables, as shown in FIG. 508. At block 520, method 500 includes performing a regression model wherein input values of the regression model include the at least one installation value.

Figure 11:
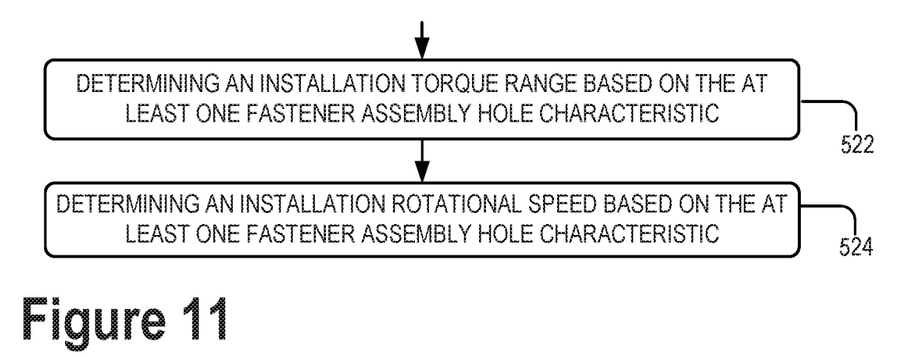
FIG. 11 shows a flowchart of an example method for one-sided fastener assembly installation and verification of the method of FIG. 5, according to an example implementation

FIG. 11 shows an example method for use with the method 500. At block 522 determining, via the processor, an installation torque range based on the at least one fastener assembly hole characteristic. At block 524, method 500 includes determining, via the processor, an installation rotational speed range based on the at least one fastener assembly hole characteristic.

Figure 12:
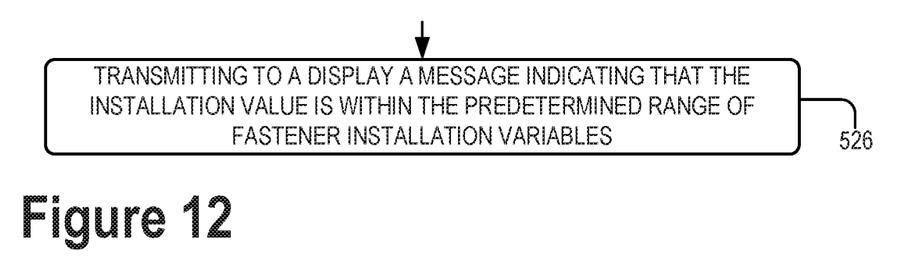
FIG. 12 shows a flowchart of an example method for one-sided fastener assembly installation and verification of the method of FIG. 5, according to an example implementation.

FIG. 12 shows an example method for use with method 500. At block 526, method 500 includes transmitting, via the processor to a display, a message indicating that the installation value is within the predetermined range of fastener installation variables upon determining the installation value is within the predetermined range of fastener installation variables.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of installing a fastener assembly comprising:
receiving, at a processor, at least one fastener assembly hole characteristic of a fastener assembly hole in a structure;
determining, via the processor, whether the at least one fastener assembly hole characteristic is within a predetermined range of fastener assembly hole variables;
determining, via the processor, a fastening device installation parameter based on the at least one fastener assembly hole characteristic;
upon determining the at least one fastener assembly hole characteristic is within the predetermined range of fastener assembly hole variables and the fastening device installation parameter, transmitting instructions, via the processor to a fastening device, to initiate installation of the fastener assembly in the fastener assembly hole according to the fastening device installation parameter;

receiving, at the processor, at least one installation value of the fastener assembly;

determining, via the processor, whether the installation value is within a range of fastener installation variables, wherein the range of fastener installation variables is based on the at least one fastener assembly hole characteristic and the fastening device installation parameter; and upon determining the installation value is within the range of fastener installation variables, providing, via the processor, an indication to the fastening device that installation of the fastener was successful.

2. The method of claim 1, wherein receiving at least one fastener assembly hole characteristic comprises receiving at least one of a fastener assembly hole depth, a fastener assembly hole width, or a fastener assembly hole location in three dimensional space.

3. The method of claim 1, wherein receiving, at the processor, at least one installation value of the fastener assembly comprises receiving at least one of an installation depth, a front side pin protrusion, a maximum torque, a torque average, or a torque angle.

4. The method of claim 1, further comprising:
upon determining the installation value is within the range of fastener installation variables, transmitting, via the processor to a display, a message indicating that the installation value is within the range of fastener installation variables.

5. The method of claim 1, wherein determining whether the installation value is within the range of fastener installation variables comprises performing a regression model wherein input values of the regression model include the at least one installation value.

6. The method of claim 1, wherein determining the fastening device installation parameter comprises determining an installation torque range based on the at least one fastener assembly hole characteristic, and determining an installation rotational speed range based on the at least one fastener assembly hole characteristic.

7. The method of claim 6, wherein transmitting instructions, via the processor to the fastening device, to initiate installation of the fastener assembly in the fastener assembly hole comprises transmitting instructions comprising the installation torque range.

8. The method of claim 6, wherein transmitting instructions, via the processor to the fastening device, to initiate installation of the fastener assembly in the fastener assembly hole comprises transmitting instructions comprising the installation rotational speed range.

9. A fastening device comprising:
a grip gage, configured to measure characteristics of a fastener assembly hole in a structure;
a nutrunner configured to install the fastener assembly in the fastener assembly hole; and
a processor configured to carry out operations, the operations comprising:
receiving at least one fastener assembly hole characteristic of the fastener assembly hole via the grip gage;
determining whether the at least one fastener assembly hole characteristic is within a predetermined range of fastener assembly hole variables;
determining a nutrunner installation parameter based on the at least one fastener assembly hole characteristic upon determining the at least one fastener assembly hole characteristic is within the predetermined range of fastener assembly hole variables and the fastening device installation parameter, transmitting instructions to the nutrunner to initiate installation of the fastener assembly in the fastener assembly hole according to the nutrunner installation parameter;

receiving at least one installation value of the fastener assembly; and determining whether the installation value is within the range of fastener installation variables, wherein the range of fastener installation variables is based on the at least one fastener assembly hole characteristic and the nutrunner installation parameter; and upon determining the installation value is within the range of fastener installation variables, providing an indication to the that installation of the fastener was successful.

10. The fastening device of claim 9, wherein the at least one fastener assembly hole characteristic of the fastener assembly hole comprises at least one of a depth, a width, or a location in three dimensional space.

11. The fastening device of claim 9, wherein the at least one installation value comprises at least one of an installation depth, a front side pin protrusion, a maximum torque, a torque average, or a torque angle.

12. The fastening device of claim 9, further comprising a global positioning system configured to determine a fastener assembly hole location corresponding to the fastener assembly hole.

13. The fastening device of claim 9, wherein determining whether the installation value is within the range of fastener installation variables comprises performing a regression model wherein input values of the regression model include the at least one installation value.

14. The fastening device of claim 9, wherein the nutrunner is configured to manually torque the fastener assembly.

15. The fastening device of claim 9, wherein the operations further comprise:
upon determining the installation value is within the range of fastener installation variables, transmitting a message to a display indicating that the installation value is within the predetermined range of fastener installation variables.

16. The fastening device of claim 9, wherein determining the fastening device installation parameter comprises determining an installation torque range based on the at least one fastener assembly hole characteristic, and determining an installation rotational speed range based on the at least one fastener assembly hole characteristic.

17. The fastening device of claim 16 further comprising a gearing arrangement configured to operate within the installation torque range.

18. The fastening device of claim 16, further comprising a gearing arrangement configured to operate within the installation rotational speed range.

19. A Non-transitory computer-readable media storing instructions executable by one or more processors, wherein the instructions, when executed, cause the one or more processors to perform functions comprising:
receiving at least one fastener assembly hole characteristic of a fastener assembly hole in a structure;

determining whether the at least one fastener assembly hole characteristic is within a predetermined range of fastener assembly hole variables;

determining a fastening device installation parameter based on the at least one fastener assembly hole characteristic;

upon determining the at least one fastener assembly hole characteristic is within the predetermined range of fastener assembly hole variables and the fastening device installation parameter, transmitting instructions to a fastening device to initiate installation of a fastener assembly in the fastener assembly hole according to the fastening device installation parameter;

receiving at least one installation value of the fastener assembly; and determining whether the installation value is within a range of fastener installation variables, wherein the range of fastener installation variables is based on the at least one fastener assembly hole characteristic and the fastening device installation parameter; and upon determining the installation value is within the range of fastener installation variables, providing an indication to the fastening device that installation of the fastener was successful.

20. The Non-transitory computer-readable media of claim 19, wherein determining whether the installation value is within the range of fastener installation variables comprises performing a regression model wherein input values of the regression model include the at least one installation value.

* * * * *